United States Patent Office 3,375,025
Patented Mar. 26, 1968

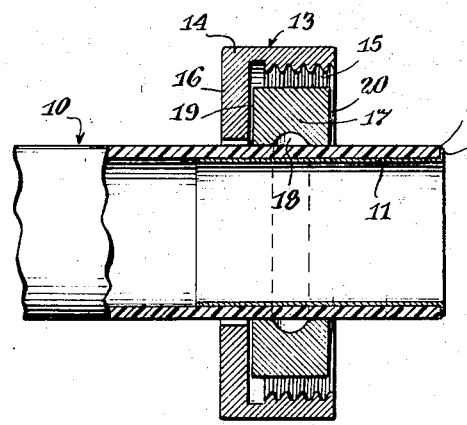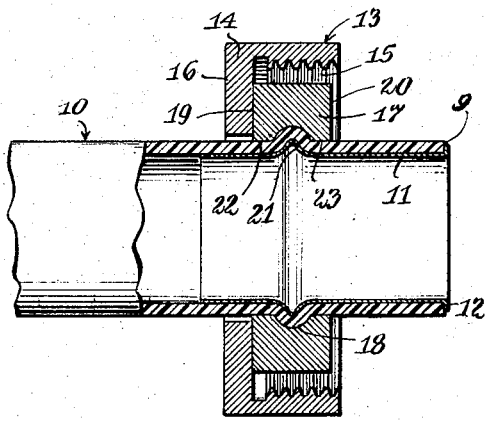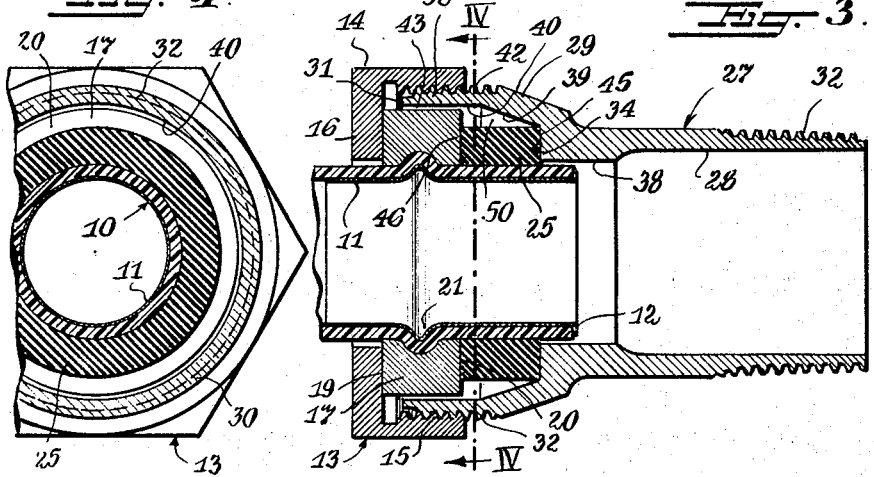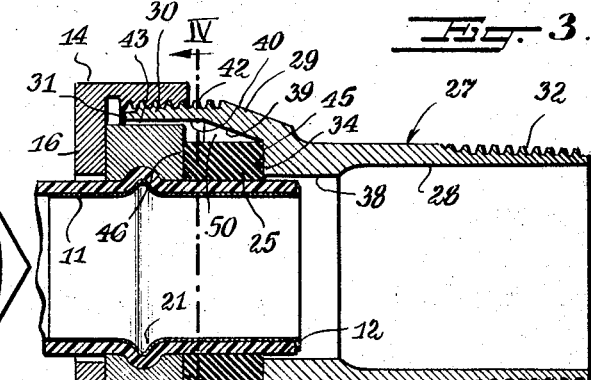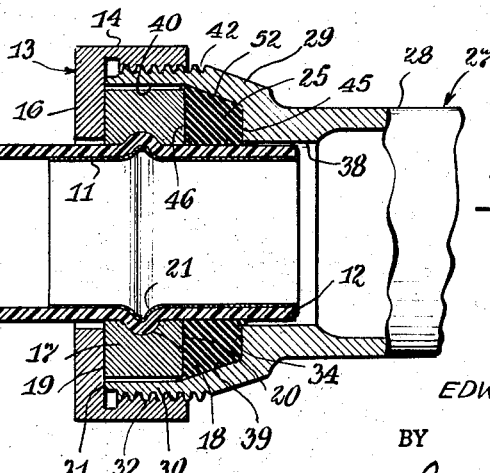
March 26, 1968    E. G. ENGEL    3,375,025
FITTINGS AND COMBINATIONS OF CONDUITS THEREWITH MAKING OR ADAPTED TO MAKE FLUID-TIGHT SEALS THEREWITH
Filed July 15, 1964    4 Sheets-Sheet 1
INVENTOR.
EDWARD G. ENGEL
BY
Angelo M. Pisarra
ATTORNEY.

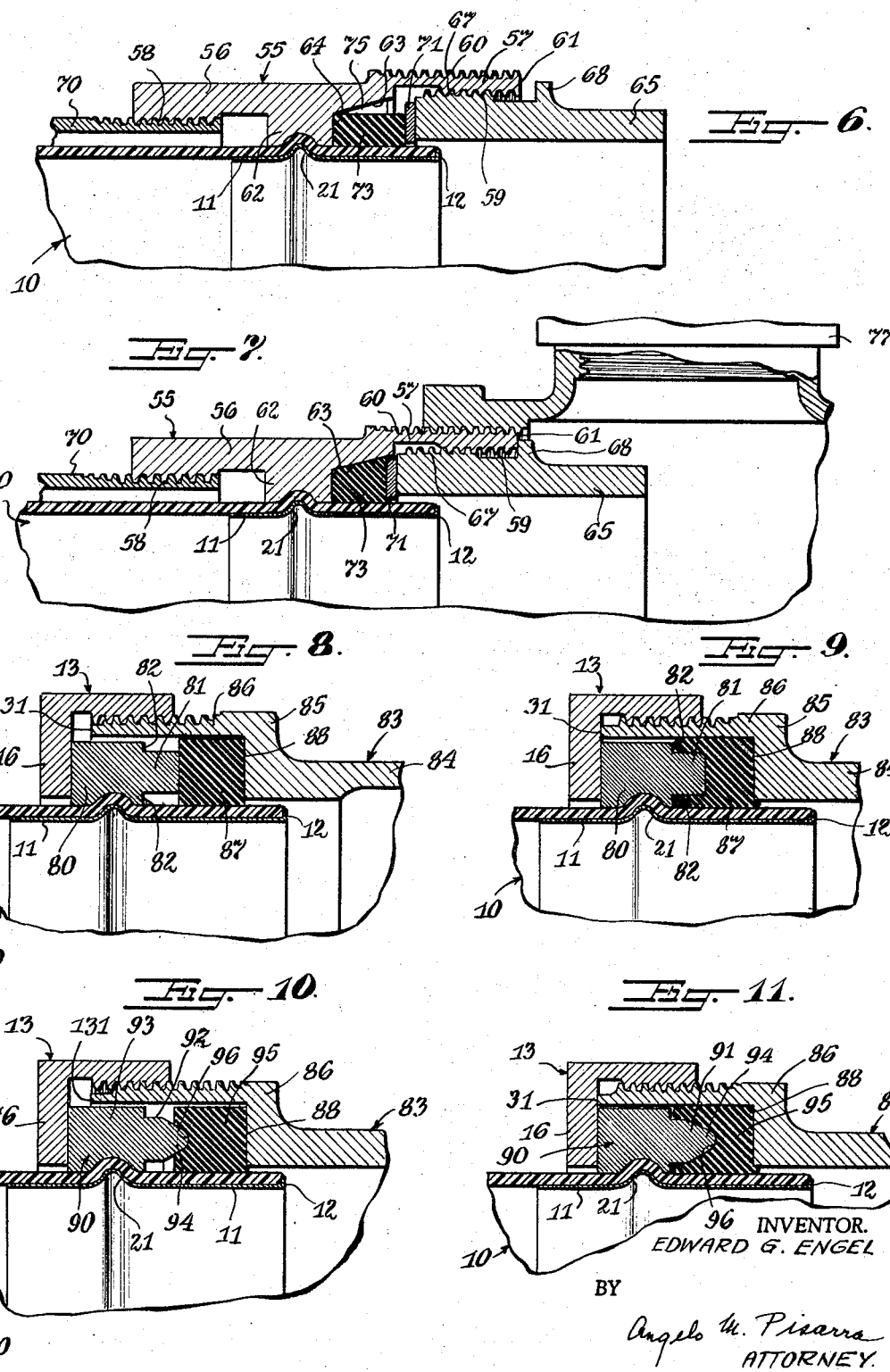

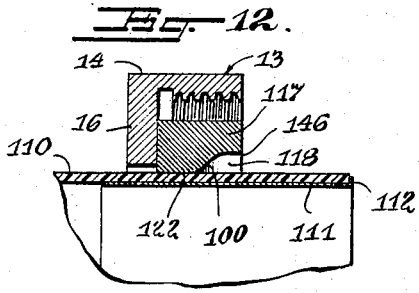
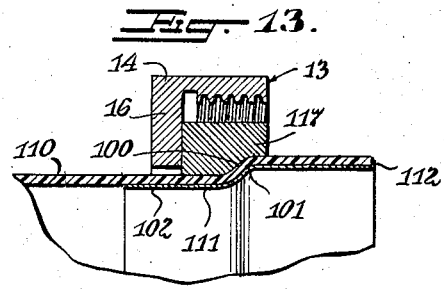
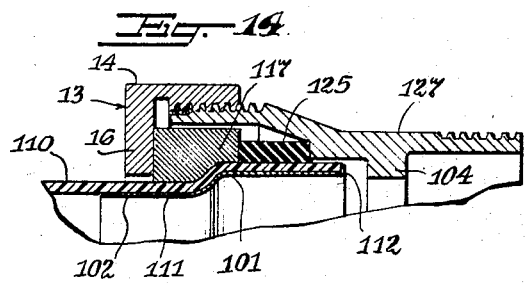
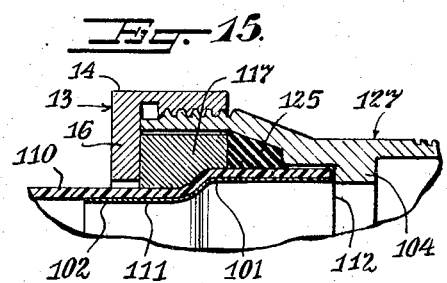
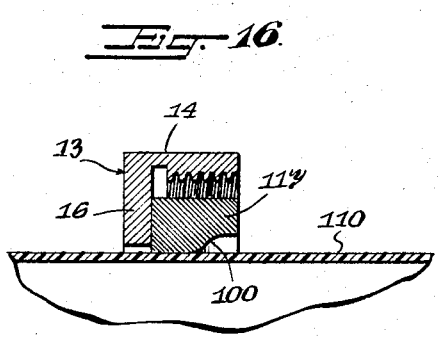
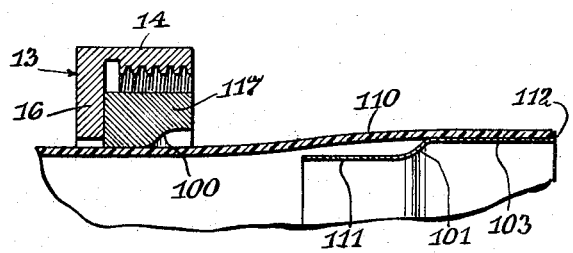
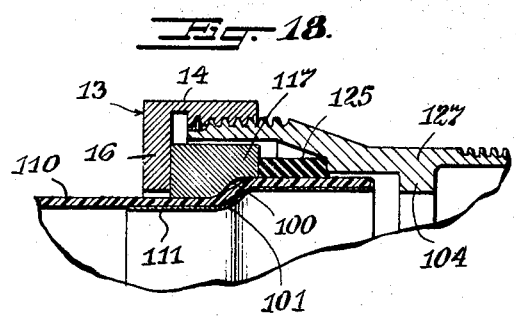
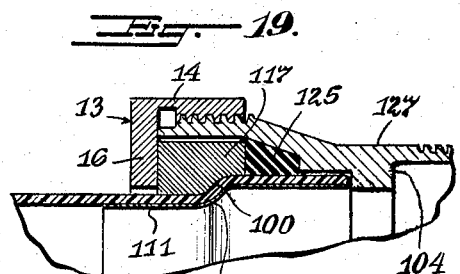
INVENTOR.
EDWARD G. ENGEL
BY
ATTORNEY.

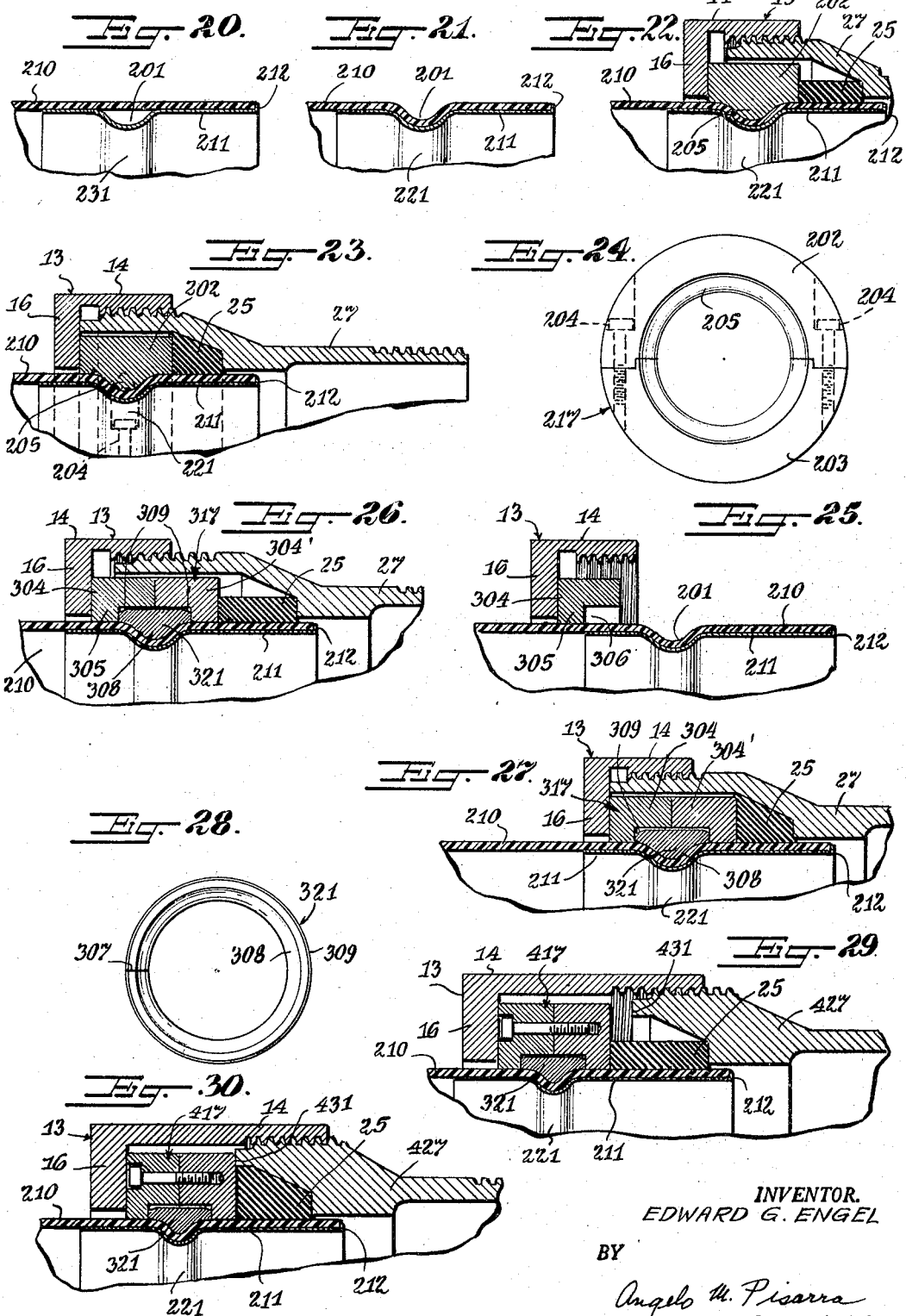

3,375,025
FITTINGS AND COMBINATIONS OF CONDUITS THEREWITH MAKING OR ADAPTED TO MAKE FLUID-TIGHT SEALS THEREWITH
Edward G. Engel, Westfield, N.J., assignor to Yara Engineering Corporation, Elizabeth, N.J., a corporation of New Jersey
Filed July 15, 1964, Ser. No. 382,909
7 Claims. (Cl. 285—15)

This invention is directed to couplings or fittings for conduits for conducting fluids, and to combinations of said fittings or couplings with said conduits and methods for making said combinations.

In one of its more specific aspects the invention is directed to novel fittings and to combinations of plastic conduits with said fittings adapted to make fluid-tight seals therewith and to methods for making them. In another of its more specific aspects the invention is directed to combinations of plastic conduits with fittings making fluid-tight seals therewith and to methods for making them.

In still another of its more specific aspects this invention is directed to plastic conduits uniquely anchored to an element of a fitting adapted to or making fluid tight seal therewith.

In the course of experimentations there have been provided the novel and unique fittings of this invention which are simple, inexpensive and may be combined with conduits to provide fluid-tight seals therewith. The unique fittings of this invention may be easily combined or coupled with conduits, and especially plastic conduits, whereby they are adapted to form fluid-tight seals therewith and are so coupled therewith as to anchor same thereto thereby to prevent pulling out of the conduit therefrom due to forces which may be exerted on said conduit caused by linear contraction thereof upon appreciable lowering of the temperature thereof.

In addition, when coupled with plastic conduits, the unique fittings of this invention include deformable resilient means together with certain means or members movable axially with respect to each other to subject said resilient means to axial pressure sufficient to deform said means thereby to store energy therein sufficient to cause permanent fluid tight seal. Said fittings also include means for limiting said axial movability so that the axial pressure to which said resilient means may be subjected cannot exceed that which would cause said means to exert radial pressure on said conduit sufficient to cause appreciable, that is, excessive or not tolerable cold flow or deformation of the plastic conduit under conditions of use. Moreover, said axial movability limiting means eliminates and obviates guessing and mistakes on the part of the fitter or operator thereby to prevent the possibility of not only damaging the conduit but also the possibility of overstressing and/or damaging said resilient means which might otherwise occur by injecting said resilient means to excessive pressures in the course of tightening of the fitting on the conduit for providing fluid tight seal therewith.

In one of the preferential aspects of this invention the axial movability of said members with respect to each other is at least as great as that necessary to cause said resilient means to be under pressure at least sufficient to deform at least 10% of the volume thereof, with the maximum axial movability of said members with respect to each other being no greater than that required to cause said resilient means to be under an axial pressure of 800 pounds per square inch. In sealing condition, said resilient means is under axial pressure in the range of 50–800 and most preferably in the range of 100–400 pounds per square inch.

The primary object of the present invention is to provide novel fittings which are simple and inexpensive and may be readily combined with one end of a conduit for carrying a fluid under pressure to provide fluid tight seal therewith.

Another object of this invention is to provide novely combinations of conduits for carrying fluid under pressure and novel fittings adapted to make fluid tight seals therewith.

A further object of the present invention is to provide novel combinations of fittings and plastic conduits for carrying fluids under pressure, with certain of the parts of said fittings being so arranged relative to each other that one end of said conduit is anchored or locked between a plurality of said parts.

These and other objects and advantages of this invention will be apparent to those skilled in the art from the following description and drawings wherein:

FIG. 1 is a longitudinal cross sectional view of one end of a conduit together with only certain parts of the novel fitting showing the arrangement thereof at the first stage of producing the novel combinations of this invention, embodiments of which are shown in some of the other figures.

FIG. 2 is a longitudinal cross sectional view of one end of the conduit together with the elements of the fitting shown in FIG. 1 after the inner liner or sleeve shown in FIG. 1 has been expanded and deformed to provide a support for the end of the plastic conduit and an anchor means to lock the end of the conduit to another element of the fitting to prevent the conduit from being pulled out of the fitting.

FIG. 3 is a view similar to FIG. 2 and shows other elements of the novel fitting coupled with the structure shown in FIG. 2. FIG. 3 shows one embodiment of the novel combinations of this invention comprising one end of the conduit and the novel fitting adapted to make fluid tight seal therewith.

FIG. 4 is a cross sectional view taken on line IV—IV of FIG. 3 in the direction of the arrows.

FIG. 5 is a view similar to FIG. 3 and shows the relationship of parts after the resilient gasket has been subjected to deformation and in that condition has energy stored therein and is exerting pressure radially against the outer surface of the conduit towards the supporting sleeve to make a fluid-tight seal between said gasket and said conduit and is exerting pressure axially against a pair of elements between which it is located to provide a fluid-tight seal with at least one of them.

FIG. 6 is a longitudinal cross sectional view similar to FIG. 3, but only as to one half the diameter thereof, and shows another embodiment of this invention.

FIG. 7 is a view similar to FIG. 6, and in general differs therefrom in the manner that FIG. 5 differs from FIG. 3 as before set forth.

FIG. 8 is a view similar to FIG. 3, and shows a modification of the embodiment shown in FIG. 3.

FIG. 9 is a view similar to FIG. 5.

FIG. 10 is a view similar to FIG. 3 and shows another modification of the embodiment shown in FIG. 3.

FIG. 11 is a view similar to FIG. 5.

FIG. 12 is a cross sectional view showing the arrangement of certain parts initially employed to provide the combinations shown in FIG. 14 which illustrates still another embodiment of this invention.

FIG. 13 is a view similar to that shown in FIG. 12, but after the supporting sleeve and the conduit have been expanded.

FIG. 14 is a view similar to that shown in FIG. 13 and shows other elements of the novel fitting coupled with the structure shown in FIG. 13; FIG. 14 shows still another embodiment of the novel combinations of this invention.

FIG. 15 is a view similar to FIG. 14 and shows the fitting in sealing condition.

FIG. 16 is a sectional view showing the arrangement of certain parts initially employed to provide the combination shown in FIG. 18, which illustrates another embodiment of this invention.

FIG. 17 is a view similar to FIG. 16 but after the end of the conduit has been expanded and the preformed inner supporting sleeve has been coupled therewith.

FIG. 18 is a view similar to FIG. 17 and shows other elements of the novel fitting coupled with the structure shown in FIG. 17; FIG. 18 shows still another embodiment of the novel combinations of this invention.

FIG. 19 is a view similar to FIG. 18 and shows the fitting in sealing condition.

FIG. 20 is a sectional view showing the initial arrangement of a pre-formed supporting sleeve with one of the conduit.

FIG. 21 is a view similar to FIG. 20 and shows the next stage, wherein the conduit has been forced into the circumferential external recess in the supporting sleeve.

FIG. 22 is a sectional view similar to FIG. 21 and shows other elements of the fitting coupled with the structure shown in FIG. 21; FIG. 22 shows still another embodiment of the novel combinations of this invention.

FIG. 23 is a view similar to FIG. 22 and shows the fitting in sealing condition.

FIG. 24 is a plan view of the rigid backing and anchoring means shown in FIGS. 23 and 24.

FIG. 25 is a sectional view showing the relationship of some of the parts at one stage in producing the novel embodiment shown in FIG. 26.

FIG. 26 is a sectional view similar to FIG. 25 and shows the other elements of the fitting coupled with the structure shown in FIG. 25; FIG. 26 shows still another embodiment of the novel combinations of this invention.

FIG. 27 is a view similar to FIG. 26 and shows the fitting in sealing condition.

FIG. 28 is a plan view of an anchoring split-ring shown in FIGS. 26 and 27.

FIG. 29 is a modification of FIG. 26 and illustrates another embodiment of the combination shown in FIG. 26.

FIG. 30 is a view similar to that shown in FIG. 29 but with the fitting in sealing condition.

In FIGS. 1–3 and 5–11 there is shown one end of a conduit 10 which is to have one of the novel and unique fittings of this invention combined therewith. The conduit 10 is composed of a plastic material and therefore is pressure deformable and pressure cold-flowable. Such conduits may be composed of polyethylene, polypropylene, polyvinyl chloride, "nylon," etc. with or without other materials for strengthening or imparting other desirable characteristics thereto. The conduit 10 is of any desirable length and finds especial application for conducting fluids, such as water and gas under pressure for supplying them to the homes and other users. The wall of conduit 10 is imperforate and impervious so that the fluid under pressure which is to flow therethrough cannot escape through said wall.

In FIG. 1 wherein a first stage of assembly is shown, first a sleeve or liner 11 is inserted into the free end of the pipe or conduit 10. The liner 11 is a strong, rigid, relatively thin, cylinder element of steel, brass, aluminum, etc. and terminates in an outwardly extending narrow annular flange 12 whose width is less than the external diameter of conduit 10. The external diameter of the liner 11 is slightly less than the internal diameter of conduit 10 so that it may be readily inserted therein thereby to easily locate the flange 12 abutting against the extremity 9 of conduit 10. Then a member 13, which is a rigid steel retainer nut, consisting of short cylinder 14 having inwardly extending threads 15 and an inwardly extending flange ring or annulus 16 integral therewith is inserted on to said conduit 10. Then a backing element 17 in the form of a ring having a central opening therethrough is also inserted on to said conduit 10. The diameter of the central opening in element 17 approximates that and is slightly greater than the external diameter of the conduit 10. The element 17 has at least one, that is one or more, inwardly extending recesses or grooves 18 in communication with the central opening thereof. The width of this recess 18 is preferably greater than the thickness of wall 10. The recess of groove 18 extends the full 360° around ring 17 at the inner face thereof and is spaced inwardly from faces 19 and 20. The meeting edges of groove 18 and the inner face of ring 17 are curved to eliminate cutting edges. Because of the groove 18 therein, the inner surface of ring 17 has a portion thereof a lesser diameter than another portion thereof. The element 17 is the form of a strong, rigid and sturdy steel ring of considerable axial and radial dimensions. The element 17 has a pair of annular faces 19 and 20 and is located on conduit 10 between the extremity 9 of the end of conduit 10 and the inner face of the flange 16, with face 19 being more remote from said extremity 9 than is face 20.

Employing the initial arrangement as before described and shown in FIG. 1, the inner sleeve 11 is expanded and radially to outwardly expand the entire sleeve 11 and to deform a section thereof intermediate the ends thereof to form an outwardly extending anchoring means in the form of a rib or collar 21 which extends a full 360° and forces a section of the conduit 10 into said recess 18 and forces the outer face of said section of conduit 10, whose cross sectional dimension has not been appreciably altered, into intimate contact and contiguous with the entire face of the wall defining the recess 18. In this construction the outer face of conduit 10 opposite the inner face of ring 17 is complementary thereto and the outer face of sleeve 11 is complementary to the inner face of conduit 10. Consequently as shown in FIG. 2 collar 21 locks the end of said conduit 10 to element 17 to maintain conduit 10 from moving axially with respect to element 17, and the remainder of said sleeve 11 has been expanded axially throughout substantially the entire area of said remainder to force substantially the entire outer surface of the sleeve 11 into contiguous and intimate contact with the inner face of the end of conduit 10. The expansion of said remainder is preferably such that the thickness of the end of the conduit 10 has been reduced only very slightly, if at all, and the cylindrical faces 22 and 23 of element 17 are in intimate contact and contiguous with the outer surface of the conduit 10 adjacent thereto. The sleeve 11, now including the anchoring means 21, acts as both an internal support and locking means for the end of the conduit 10 as shown in FIG. 2. The construction shown in FIG. 2 is then first combined with a deformable and resilient means 25 and then with a body member 27 of the novel fitting to provide the unique combination shown in FIG. 3 wherein the fitting is adapted to make fluid-tight seal with the conduit 10. In this embodiment the body member 27 is a strong, rigid member composed of metal such as brass, ferrous metal, etc. and consists of a cylinder section 28 integral with an outwardly flared section 29 terminating in a short cylinder section 30 having an outer extremity 31. The section 28 has external threads 32 at one end thereof for coupling with an internally threaded T, elbow or other fitting member not shown. The other end of the section 28 terminates in an inner surface, face or shoulder 34 in the form of an annulus whose internal diameter is at least as great as and preferably only a little greater than the external diameter of conduit 10 and whose outer diameter is at least as great as the outside diameter of the annular face 45 of the resilient means 25. The section 28 has an internal cylindrical surface whose diameter is at least as great as and preferably greater than the outside diameter of conduit 10 and that portion 38 of said inner cylindrical surface has a diameter which is preferably only a little greater than the outside diameter of conduit 10 encircled thereby. The section 29 has an inner surface or face 39 which is of generally frusto-conical configuration. The section 30 has an inner cylindrical face or surface 40 whose diameter is at least as great as and preferably only a little greater than the external diameter of the ring 17; and the free end of section 30 has external threads 42.

The means 25, which serves as a gasket, employed in the embodiment shown in FIG. 3 is in the form of a ring or collar of considerable axial and radial dimension and has a bore therethrough whose diameter approximates, that is, is the same as, only slightly greater or slightly less than the external diameter of conduit 10. The end surfaces or faces 45 and 46 of gasket 25 are annular in form as shown. The gasket 25 is composed of any desirable rubbery material, such as natural rubber, neoprene, "GRS," etc. and/or other available rubbery material and has a durometer in the range of about 30 to about 75 and preferably in the range of about 45 to about 65 and in this particular instance of approximately 60. The dimensions of the gasket 25 is preferably such that its radial dimension, that is the average distance between the internal and external cylindrical surfaces thereof, is no greater than three times the axial dimension thereof, that is the average distance between the faces 45 and 46 thereof, and its axial dimension is no greater than three times its radial dimension. In the specific embodiment shown the faces 45 and 46 are parallel and are at right angles to the axis of the bore of the gasket 25. It is also preferable that the volume of the gasket 25 be in the range of about 0.2 to about 0.6 times the nominal diameter of the conduit 10.

The unique combination or assembly as shown in FIG. 3 is made by inserting the end of the conduit 10 of FIG. 2 through the bore of the gasket 25 to locate face 46 of gasket 25 close to the face 20 of ring 17 and then locating one end of the body member 27 around the end of conduit 10 and moving it axially until the shoulder 34 thereof is close to the face 45 of gasket 25. Then the element 13 is threadedly coupled with member 27 to locate it in the position shown in FIG. 3, whereby end 31 is located within a range of predetermined distances from the inner face of flange 16 which in this embodiment serves as positive stop means for limiting axial movement therebetween and between shoulder 34 and face 20. The distance between end 31 and the inner surface of flange 16 is variable dependent upon the durometer of the gasket 25, the specific dimensions of gasket 25, the axial pressure under which gasket 25 is to be subjected and maintained and also the volume of the unoccupied space in chamber 50 to be filled thereby when in deformed condition.

In the specific combination shown in FIG. 3, the outside diameter of face 45 of the gasket 25 is no greater than, but as shown is equal to, although it may be less than that of the shoulder 34; and the inner face 40 of the section 30 is spaced only a small distance from the outer cylindrical surface of the ring 17. Also in said specific combination, the gasket 25 is in substantially relaxed condition and its ends 45 and 46 are in contact with the shoulder face 34 and the ring face 20. In such condition and when so disposed, the gasket 25 fills only part of the unoccupied space or chamber 50 between the outer surface of conduit 10 and the inner surface of the member 27, consisting of surfaces 38, 34, 39 and 40, between a pair of parallel planes perpendicular to the central axis of said body member, with one of said planes being contiguous with the free extremity 9 of conduit 10 and the other being contiguous with the extremity 31 of member 27. The unique construction shown in FIG. 3 represents a specific embodiment of a novel combination of this invention, comprising a plastic conduit in combination with the unique fitting shown which is anchored thereto and is adapted to make fluid tight seal therewith. In order to make such fluid tight seal, the operator applies torque to the element 13 to rotate it in one direction whereupon element 13 or 27 is moved axially with respect to the other whereby element 17 or 27 is moved axially with respect to the other thereby simultaneously reducing the distance between the faces 20 and 34 reducing the volume of said unoccupied space 50. This rotation of element 13 with consequent axial movement of said elements with respect to each other is continued until the end 31 of the member 27 meets the inner face of the flange 16 which acts as positive stopping means to prevent further rotation of element 13 in its original direction and also said axial movement of said elements 13 or 27 and 17 or 27 towards each other. This sudden jolting stop is readily discernible by the operator when end 31 meets the inner face of flange 16 and in addition when such meeting occurs, it prevents any further rotation of element 13 in its original direction. At this stage as shown in FIG. 5 the novel fitting is in and is maintained in anchored and sealing condition with respect to the conduit 10.

When the element 13 was rotated as before set forth only low or moderate torques were applied to element 13. And, in the course of said rotation the axial movement of said elements with respect to each other axial pressure was applied to or exerted upon the gasket 25 between faces 20 and 34 thereby to subject gasket 25 to axial pressure of at least 50 and no greater than 800 pounds per square inch. Due to the axial movement of the element 17 or 27 with respect to the other, the gasket 25 was deformed to store energy therein. Gasket 25 was deformed at least to such extent that at least 10% of the volume thereof was moved into and is now located and maintained in unfilled part of the unoccupied space 50 in which the gasket 25 was originally located and preferably also so that at least 50% of the outer circumferential surface 52 of the gasket 25 is contiguous with the inner surface 39 of member 27 opposite thereto. In this embodiment substantially all of said outer circumferential surface 52 is contiguous with the inner face 39 of the member 27 opposite thereto. Also in this embodiment the entire chamber between the conduit 10 and inner surface 39 bounded by the faces 20 and 34 is filled by deformed gasket 25 as shown in FIG. 5. In addition a small proportion of gasket 25 has entered into the small parts of the narrow spaces between conduit 10 and inner face 38 and the narrow space between outer surface 43 of ring 17 and the inner surface 40 of section 30. The latter occurs after substantially the entire chamber between conduit 10, surface 39 and surfaces 20 and 34 has been filled by deformed gasket 25 under axial pressure in the range of 50-800 pounds per square inch. A skilled operator with a good sense of touch could in some instances while rotating nut 13 become aware of the fact that the gasket 25 has been sufficiently deformed to substantially completely fill said chamber as shown in FIG. 5 due to the sudden increase in the rate of the increment of torque which must be applied by him to cause further deformation of gasket 25 to cause forcing of an undesirable amount thereof into said narrow spaces. However, most operators will not be aware of this or if they are and are careless, will continue to apply torques of increasing magnitude to the nut 13, whereupon gasket 25 will be subjected to higher and higher axial pressures which may be greater than those desired thereby resulting in appreciable, that is, harmful or excessive cold flow of the conduit 10, overstressing of the gasket, and/or splitting or otherwise damaging the gasket 25. However, according to this invention, the foregoing undesirable effects cannot occur and are prevented from occurring due to the presence of the stopping means before described which eliminate reliance upon the skill of the operator and act as a positive stop to prevent or limit the axial pressure on the gasket 25 from exceeding that required for causing appreciable cold flow of conduit 10 due to the radial pressure exerted thereon by said gasket. As shown in FIG. 5, the gasket 25, which is substantially completely confined and under axial pressure in the range of 50-800 pounds per square inch, has such energy stored therein as to exert said axial pressure on the shoulder face 34 and ring face 20 to provide fluid-tight seals thereat and radial pressure on that part of conduit 10 subjacent thereto and supported by sleeve 11, and also on the face 39 to provide fluid-tight seals thereat without deformation or appreciable cold flow of conduit 10. In this specific embodiment the essential fluid-tight seals are at the outer face of conduit 10 and at least a portion of the surface consisting of surfaces 34 and 39, so effected by the gasket 25 under pressure. Thus effective fluid-tight seal is provided between the conduit 10 and fitting anchored thereto. This condition will be so maintained for years and until the nut 13 is rotated in the opposite direction by an operator.

Another embodiment of this invention is a service head adapter fitting in combination with one end of the plastic conduit 10. The adapter consists of sleeve 11, together with anchoring means 21, body member 55, retainer nut 65, ring 62 and follower 71 and gasket 73 which is identical with gasket 25. The body member 55 is a rigid metallic member composed of brass, iron, aluminum, etc. and consists of a section 56 whose internal diameter is greater than the external diameter of conduit 10, and a section 57 integral therewith and having an internal diameter greater than that of the section 56. One end of section 56 has internal threads 58 and the section 57 has internal threads 59 and external threads 60 and terminates in extremity 61. Integral with the section 56 is the internal ring 62 which is identical with the ring 17 and has face 64 corresponding with face 20. One end of the internal face or surface of the section 56 is a frusto-conical surface 63 roughly the same as the surface 39, but has the end thereof of largest diameter remote from the ring 62. The retainer member 65 is a short rigid metal cylinder whose internal diameter is greater than the external diameter of conduit 10. One end of the retainer 65 has external threads 67 and an outwardly extending stop ring 68 integral therewith located between the ends thereof.

In this embodiment of the invention, one end of plastic pipe 10 is pulled through pipe 70 in the wall of a home, factory or other building. Then the sleeve 11 is inserted into the conduit 10 to locate it in the position shown in FIG. 1 after which one end of the member 55 is moved over that end of conduit 10 and is threadedly coupled with the pipe 70. Subsequently, the sleeve 11 is expanded in the manner heretofore described to provide the anchoring collar or rib 21 and to provide an effective support by the remainder of sleeve for the end of conduit 10. Then the gasket 73 is placed over to the end of the conduit 10 to locate an annular face thereof against face 64 of the ring 62, after which the relatively thin rigid brass follower ring 71 is slipped on to conduit 10. The external diameter of ring 71 is greater than the external diameter of gasket 73 and preferably a little less than the maximum diameter of the internal frusto-conical surface 63 which terminates in a narrow internal cylindrical section approximating the thickness of the follower 71. The ring 71 has an internal diameter which is only a little greater than the external diameter of conduit 10. The member 65 is threadedly connected to the section 57 and bears against ring 71 to locate and maintain the ring 71 adjacent an annular face of the gasket 73 to provide the novel combination shown in FIG. 6. As therein shown the gasket 73 has not yet been placed under appreciable axial pressure and the gasket 73 occupies only part of the space in chamber 75 between inner surface of member 55 and that part of conduit 10 encircled thereby and bounded by parallel planes perpendicular to the axis of member 55 and respectively contiguous with the annular faces of gasket 73.

The nut 65 of this combination shown in FIG. 6 is rotated in one direction as was nut 13 in FIG. 3 until the stop means 61 and 68 meet to prevent further rotation of nut 65 and to prevent further axial movement of elements 62 and 65 with respect to each other. Due to rotation of the retainer nut, axial movement between the retaining nut and the anchored ring occurred whereby the distance between the ring 62 and the nut 65 and follower 71 has been reduced and the gasket 73 has been deformed to at least an extent which is at least 10% of the volume thereof and is under axial pressure in the range of 50–800 pounds per square inch whereby energy is stored therein and gasket 73 substantially completely fills chamber shown in FIG. 7 which is of reduced volume and consists of the space between surface 63 and the outer surface of conduit 10 opposite thereto and bounded by parallel planes contiguous with the extremities of surface 63 and perpendicular to the axis of element 55. As shown in FIG. 7 the gasket 73 substantially completely fills said chamber of reduced volume and is substantially completely confined therein. This condition is maintained by the action of the cooperating threads 59 and 67 whereby the surface of conduit 10, an annular surface of ring 62, internal surface 63 and a surface of the ring 71 make fluid-tight seals with the faces of the deformed gasket 73 due to the axial and radial pressure exerted thereon by said gasket 73 as shown in FIG. 7. In a construction of this type it is essential that the gasket 73 seals both the outer surface of conduit 10 and at least a part of the surface consisting of surfaces 64 and 63. Then said novel fitting anchored to the end of the conduit 10 and in sealing condition therewith is coupled with a T or other fitting 77 partially shown in FIG. 7.

The embodiment shown in FIG. 8 is the same as that shown in FIG. 3 except that one end of the ring 17 has been modified as has been an end of the body member 27 and also the gasket 25. The ring 80 shown in FIG. 8 is the same as ring 17 except that one end has external annular recesses extending completely therearound to provide a central annular projection or nose 81 integral with the remainder thereof and forming annular shoulders 82 therewith. The body member 83 shown in FIG. 8 consists of a section 84, the same as section 28 of FIG. 3 and in integral with a section 85 terminating in section 86 the same as section 30 of FIG. 3. The gasket 87 shown in FIG. 8 is the same in all respects with gasket 25 except that its radial dimension is greater than that of gasket 25 and its outside diameter is preferably at least slightly less than the diameter of the internal surface of the section 86. In this embodiment, the gasket 87 is of such volumes no greater and preferably less than 90% of the volume of a chamber defined by parallel planes contiguous with the shoulder 82 and with shoulder 88 of member 83 and perpendicular to the axis of member 83 and also by the inner surface of section 86 and the outer surface of the conduit 10.

This embodiment which is a modification of the embodiment shown in FIG. 3 and heretofore described, is treated in the same manner as the construction shown in FIG. 3 thereby to provide fluid-tight seal with the conduit 10 anchored to the ring 80 thereof as shown in FIG. 9. In its sealing and anchored condition the parts are so maintained with the gasket 87 being substantially completely confined in and substantially completely filling said chamber now of reduced volume as shown in FIG. 9, with the stop 31 located against the inner face of flange 16. As in all of the other embodiments of this invention the gasket has been deformed by an extent equal to at least 10% of the volume thereof and at least 10% of the volume of said gasket has been forced into space originally unoccupied by said gasket when under no appreciable axial pressure. In this condition the gasket is under and so maintained under axial pressure in the range of 50–800 pounds per square inch, whereby the inner surface of section 86, surface 88, the outer surface of conduit 10 and the surface of element 80 in contact therewith are under radial and axial pressure whereby said seals are effectuated and maintained.

The embodiment shown in FIG. 10 is the same as that shown in FIG. 8 except that the ring as well as the gasket therein have been modified. In this modification of the invention, 90 refers to the ring having a projection or nose 91 in the form of concentric shallow solid cylindrical section 92 integral with the body part 93 thereof and terminating in a frusto-cone 94 of considerable length and whose terminus is of blunt convex curvilinear contour. The gasket 95 shown in FIG. 10 is the same as gasket 87 except that it has a shallow recess or pocket 96 in one face thereof opposite, complementary to and in line with the end of the nose 91. The elements of this combination shown in FIG. 10 are combined in the same manner as that used for providing the combination shown in FIG. 3; and like the combination shown in FIGS. 3 and 8 the nut 13 is rotated to move 13 or 83 and 90 or 83 axially with respect to the other until stop 131 meets the inner face of flange 16 thereby to reduce the distance between ring 90 and the face 88 whereby the space in the chamber therebetween is reduced and the gasket 95 under axial pressure in the range of 50–800 pounds per square inch is deformed by nose 91 to such an extent that at least 10% and preferably more than 10% of the volume thereof is deformed to store energy therein and forced into space in said chamber of reduced size, originally unoccupied by the gasket 95. The novel fitting and conduit in anchored and sealing condition as shown in FIG. 11 are so maintained by the cooperating threads of the nut 13 and the part 86 of body member 83. In this condition, the deformed gasket 95 is substantially completely confined in and substantially completely fills said chamber of reduced volume. Said gasket 95 which is under axial pressure of 50–800 pounds per square inch, exerts axial and radial pressure on all of such surfaces of elements 10, 90 and 83 in contact therewith to make fluid-tight seals thereat.

Another embodiment of the invention are shown in FIGS. 14 and 15 and are in the nature of modifications of the constructions shown in FIGS. 3 and 5 respectively. The construction shown in FIG. 14 includes a body member 127, gasket 125, and nut 13, which is a modification of the embodiment shown in FIG. 3. To provide the construction shown in FIG. 14 the nut 13 is mounted on one end of a conduit 110 similar in all respects with conduit 10. Then a sleeve 111 having a flange 112 is inserted into that end of conduit 110 and is similar in all respects with sleeve 11. Then there is mounted on conduit 110 a ring 117 similar in all respects with ring 17 except that for the recess 18 therein, it has a recess 118 therein. The recess 118 like recess 18 is of appreciable depth and width, but extends through both the inner cylinder face 122 thereof and the outer annular face 146 thereof. The surface 100 of said ring 117 defining said recess 118 is of curvilinear or arcuate formation at one end thereof as shown.

Then with the ring 117 only or the ring 117 and the nut 13 maintained in the position shown in FIG. 12, the sleeve 111 is expanded or deformed outwardly thereby to expand and deform the conduit 110 to the condition shown in FIG. 13. In that condition, that portion of conduit 110 opposite the deformed portion 101 of sleeve 111 is likewise deformed and its outer surface is contiguous with and in intimate contact with the surface 100 throughout the entire area thereof; the portion 102 of sleeve 111 has a diameter only a little greater than that originally of sleeve 111 and its outer surface is in intimate contact throughout its area with the inner surface of the conduit 110 opposite thereto; and the portion 101 and portion of conduit 110 opposite thereto are of significantly and materially greater diameter than that of portion 102. In this relationship of parts the sleeve 111 in deformed condition as shown in FIG. 3, the sleeve 111 supports the end of the conduit 110 throughout the entire part thereof opposite said sleeve and also maintains that end of the conduit 110 coupled to the ring 117.

Then the gasket 125, of greater internal and external diameters than gasket 25 but otherwise the same as gasket 25, is mounted on the conduit 110 and makes a fairly snug fit thereon. Then the body member 127 is coupled with the nut 13. The body member 127 is similar to body member 27 but includes an additional element 104 which is a stop ring integral therewith and extending inwardly therefrom.

This combination as shown in FIG. 14 may be "tightened" to provide a "sealing" combination shown in FIG. 15 which is similar to that shown in FIG. 5. The nut 13 is rotated whereby the nut 13 or body member 127 is moved axially with respect to the other until one end of the body member 127 strikes the inner face of the flange 16 and the flange 112 strikes the ring 104, these occurring simultaneously, or the flange 112 is located near but not in contact with the stop ring 104 at this stage. Due to such action, the gasket 125 is in the same condition as gasket 25 of FIG. 5 as hereinbefore described. With the parts now being in the condition shown in FIG. 15, the end of conduit 110 is locked by sleeve 111 in cooperation with the ring 117 and stop ring 104 from being moved axially to any appreciable degree in either direction while the coupling is in sealing condition.

The construction shown in FIG. 15 may be provided by following different procedures, and using a supporting sleeve which has been pre-formed. It may be achieved by mounting the nut 13 and the ring 117 on the end of conduit 110 as shown in FIG. 16. Then the outer end of the conduit is hot-expanded or otherwise expanded to accommodate the deformed sleeve 111. The sleeve 111 is inserted therein, with flange 112 abutting against the free end of conduit 110. The portion 103 thereof is then only slightly expanded to force the outer surface thereof into intimate contact throughout with the inner surface of conduit 110 opposite thereto to provide the arrangement of elements shown in FIG. 17. Then the gasket 125 is mounted on conduit 110 after which the nut 13 and ring 117 are pushed towards the gasket 125 and are so located that the body member 127 which is now placed in position makes initial threaded engagement with nut 13. Then with the body member 127 being maintained in fixed position, the nut 13 is rotated and this rotation is continued thereby to force the ring 117 to move axially to the position shown in FIG. 18. In that position, a face of the ring 117 makes initial contact with the gasket 125 and the frusto-conical portion of the expanded conduit 110 has been deformed, but incompletely deformed in the space between the surface 100 of ring 117 and the deformed portion 101 of the sleeve 111. This construction shown in FIG. 18 is in the nature of that shown in FIG. 3. Upon continued rotation of ring 13 in the same direction, the ring 13 forces the ring 117 axially forwardly to further deform that part of conduit 110 between portion 101 and surface 100 into intimate contact throughout, and to move the flange 16 against the stopping end of body member 127. With the parts being so disposed with relation to each other, the gasket 125 is in the same condition as gasket 25 of FIG. 5 and the flange 112 is located either in contact or close to the stop 104 which acts to prevent appreciable axially movement of conduit 110 in one direction and the ring 117 acts to prevent axially movement of conduit 110 in the other direction, as shown in FIG. 19.

Still another embodiment of the invention is that shown in FIG. 22, and is similar to that shown in FIG. 3. To provide the construction shown in FIG. 22, a pre-formed sleeve 211 is used and is the same as sleeve 11 except that its deformed portion is in the form of an internal collar or rib 221 defining an external circular recess 201. The sleeve 211 is disposed in the conduit 210, with its flange 212 abutting against the outer extremity of conduit 210, as shown in FIG. 20. With or without first subjecting sleeve 211 to a small degree of expansion to force the outer cylindrical surfaces thereof into intimate contact with those portions of conduit 210 opposite thereto, the conduit 210 is deformed to force a portion thereof into intimate contact with outer surface of rib 221 defining recess 201 as shown in FIG. 21. Then nut 13, a pair of like semi-circular elements 202 and 203 and gasket 25 are mounted on the conduit 210, and body member 27 is coupled with nut 13, as shown in FIG. 22. Each of the elements 202 and 203 is a rigid, sturdy, steel or brass element like ring 17. The element 203 has two-threaded openings therein and element 202 has two nut-head accommodating recesses with each being in communication with an opening for the shank of a stud bolt 204. Each of said elements 202 and 203 has an internal rib 205 integral therewith at the mid-width thereof and extends the full 180°. These elements 202 and 203 are disposed one below the other, with the surface of ribs 205 thereof being complementary to the exterior surface of conduit 210 in recess 201. The elements 202 and 203 are coupled with each other by a pair of the stud bolts 204 which maintain them in clamping position and together form a backing ring 217 having the rib 205 integral therewith. Then gasket 25 is mounted on conduit 210 and body member 27 is coupled with the nut 13 to provide a combination shown in FIG. 22 which is similar to that shown in FIG. 3. The nut 13 of this combination may be rotated thereby to provide the "sealing" combination shown in FIG. 23 which is the same as that shown in FIG. 5 except for the modified sleeve and ring structure.

Another embodiment of this invention is the construction shown in FIG. 26. This construction may be produced by first providing the construction shown in FIG. 21. Then a retainer nut 13 is mounted thereon. Subsequently a ring 304 is mounted thereon as shown in FIG. 25. The ring 304 consists of a short cylinder or collar 305 having a recess 306 therein extending the full 360° therearound and being of appreciable radial dimension. Then a circumferentially resilient rigid snap ring 321 of spring metal is mounted thereon. The split ring 321, as shown in FIG. 28 and cross-sectionally in FIGS. 26 and 27 is a single unitary ring split at 307, and has a circumferential length a little less than that of the outer face of the portion of the conduit in recess 201. The width of the ring 321 is appreciably greater than the width of the channel or recess 201. The ring 321 is internally recessed to provide a circumferential boss or rib 308 complementary to the external face of the portion of conduit 110 located in the circumferential recess 201 in rib 221. The ring 321 is so mounted that the circumferential rib 308 thereof is located in the depressed portion of the conduit 210. The upper corners of ring 321 are cut-away at 309. After the split ring 321 is located in the position shown in FIGS. 26 and 27, an identical ring 304' is slipped over the conduit 210. These rings 304 and 304' are moved towards each other to locate them in position close to each other, with the outer portion of split ring 321 located in the recesses therein. These rings 304 and 304' so disposed form a circular channel and may not be secured to each other or if desired may be secured to each other by one or more stud bolts as shown in FIG. 30. The gasket 25 is mounted on conduit to that side of the ring 304' closer to the extremity of conduit after which the body member 27 is threadedly connected to the threaded end of the nut 13. The nut 13 is rotated thereby to bring the opposing faces of rings 304 and 304' together thereby to form a backing ring 317 and to bring the opposing faces of the ring 317 and body member 27 into contact with the annular faces of the gasket 25 to provide a construction shown in FIG. 26 which is similar to that shown in FIG. 3. As shown the inner faces defining the channel in ring 317 are located close to the opposing faces of snap ring 321 whereby the ring 317 keeps the ring 321 from excess enlargement or spreading and maintains the same in position. The members 304 and 304' in cooperating relationship with ring 321 together form a backing means having a rib 308. Then upon continued rotation of the nut 13 the body member 27 or the ring 317 is moved with respect to the other to deform the gasket 25 and provide the same sealing of fitting and conduit as that described and shown in FIG. 5, and in this embodiment is shown in FIG. 27.

The embodiment shown in FIG. 29 is a modification of that shown in FIG. 26 and differs therefrom only in that the backing ring thereof is of greater external diameter than that in FIG. 26 and the forward end of the body member which in this instance bears reference numeral 427 has been shortened. The stop-extremity 431 of body member 427 is opposite a face of the backing ring and abuts that face as does the end of body 27 abut the face of flange 16 to prevent further axial movement of the nut 13 with respect to body member 427 and also of the backing ring with respect to the body member thereby to provide the construction shown in FIG. 30 wherein the gasket therein is in the same condition as that shown in and described with respect to the construction shown in FIG. 5.

These various combinations may be changed to include some of the modifications of various elements thereof. For example, the ring 17 may be in two pieces if so desired; however, I prefer that it be a single piece as shown.

It is also preferred that each of the gaskets shown in the FIGS. 3, 6, 8, 10, 14, 18, 22, 26, and 29 be subjected to deformation of 10–40% thereof, that is that 10–40% thereof be deformed and moved into a space other than the space originally occupied by the gasket before it was subjected to axial pressure. It is also preferred that the volume, durometer and dimensional relationship of all of said gaskets be in the ranges of limits herein set forth in the description of means 25.

In all of the embodiments of this invention, each of the gaskets when not under axial pressure is located in but does not fill the unoccupied space between the outer surface of the plastic conduit and the inner surface of the body member, which inner surface extends in a direction towards the free end of conduit from a plane contiguous with and parallel to that annular face of the backing ring more remote from said free end. However, when the gasket is under and maintained under deformation as before set forth the gasket is in axial compression and also exerts force radially towards both the outer surface of the conduit thereunder and the inner surface of the body member, with the innermost surface of the gasket throughout substantially the entire area thereof gripping the outer surface of the conduit and the outer circumferential surface of the gasket throughout substantially the entire area thereof exerting radial pressure of the internal surface of said body member opposite thereto and is thereby maintained under radial confinement whereby said pressures are maintained therebetween.

While the members which are threadedly coupled with the body members serve to maintain the gaskets in energy storing condition as shown in FIGS. 5, 7, 9, 11, 15, 19, 23, 27, and 30, the gaskets in that condition serve to effectively seal the fittings with the plastic conduits and further serve the additional function of preventing the rotation of one of said members with respect to the other due to the axial pressure exerted thereon, thereby to prevent loosening thereof. Effective sealing and anchoring of the fittings with the plastic conduits as shown in said figures are maintained over long periods of time.

While the invention has been described in detail, it is not to be limited to the specific constructions shown for various changes and modifications thereof may be made without departing from the spirit thereof.

I claim:
1. A combination comprising a pressure-deformable synthetic resinous plastic conduit, rigid sleeve first means located in one end of said conduit, rigid circumferential second means extending around said conduit and said first means, one of said means having a circumferential recess, a portion of said conduit being in said recess, said portion having a recess; the other of said means including a circumferential part disposed in said second mentioned recess, pressure-deformable rubbery resilient third means extending around said conduit and said sleeve, a body member and a member operatively connected with said body member, said third means disposed between a face of one of said means and a face of one of said mem- bers, one of said members being axially movable with respect to the other to reduce the distance between said faces thereby to apply axial pressure of at least 50 pounds per square inch to said third means to store sufficient energy therein that said third means will exert sufficient pressure on said conduit to provide effective sealing, said first and second means cooperating with each other to maintain said part in said second mentioned recess to prevent substantial axial movement of said end of said conduit with respect to said first and second means.

2. A combination comprising a pressure-deformable synthetic resinous conduit, a rigid sleeve in one end of said conduit, a pressure-deformable resilient rubbery gasket extending around said sleeve and said end, a rigid ring having an opening therethrough and a circumferential recess in communication with said opening, said end extending through said opening with a portion having a circumferential recess, circumferential means carried by said sleeve and disposed in said second mentioned recess to maintain said portion in said first mentioned recess to prevent substantial axial movement of said end relative to said ring and sleeve, a body member and a member operatively connected with said body member, said gasket disposed between a face of said ring and a face of one of said members, one of said members being axially movable with respect to the other to reduce the distance between said faces thereby to apply axial pressure of at least 50 pounds per square inch to said gasket to store sufficient energy therein that said gasket will exert sufficient pressure on said conduit to provide effective sealing.

3. A combination as defined in claim 2,
said ring being secured to said body member, and a rigid follower ring extending around said sleeve and said end and located between said gasket and a face of the other member, said members being threadedly coupled together.

4. A combination comprising a pressure-deformable synthetic resinous plastic conduit, a rigid sleeve in one end of said conduit, a pressure deformable resilient rubbery gasket extending around said sleeve and said end, said sleeve having a circumferential recess, a circumferential portion of said end disposed in said recess, said portion having a circumferential recess, a rigid ring having an opening therethrough, said ring extending around said sleeve and said said end and including circumferential means disposed in said second mentioned recess to maintain said portion in said first mentioned recess to prevent axial movement of said end with respect to said sleeve and said ring, a body member and a member operatively connected with said body member, said gasket disposed between a face of said ring and a face of one of said members, one of said members being axially movable with respect to the other to reduce the distance between said faces thereby to apply axial pressure of at least 50 pounds per square inch to said gasket to store sufficient energy therein that said gasket will exert sufficient pressure on said conduit to provide effective sealing.

5. A combination comprising a pressure-deformable synthetic resinous plastic conduit, a rigid sleeve in one end of said conduit, said sleeve having a circumferential recess, a portion of said end disposed in said recess, said portion having a circumferential recess, a ring in said second mentioned recess, a resilient rubbery gasket extending around said sleeve and said end, means for preventing excessive radial enlargement of said ring and for maintaining said gasket under at least 50 pounds per square inch axial pressure to store sufficient energy therein that said gasket will exert sufficient pressure on said conduit to provide effective sealing, said means including a plurality of members extending around said end, a pair of said members being threadedly coupled together, another of said plurality of members, said gasket disposed between a surface of said another of said members and a surface of one of said pair of members, another surface of said another of said members being close to said ring to prevent said enlargement.

6. A combination of a pressure-deformable synthetic resinous plastic conduit, a rigid sleeve in one end of said conduit, said sleeve having an external circumferential recess, a portion of said end disposed in said recess and having an external recess, a ring disposed in said second mentioned recess, a resilient rubbery gasket extending around said sleeve and said end, means for preventing excessive radial enlargement of said ring thereby preventing said ring from being displaced from said second mentioned recess, and for maintaining said gasket under axial pressure of at least 50 pounds per square inch to store sufficient energy therein that said gasket exerts sufficient pressure on said end to provide effective sealing, said means comprising a pair of ring elements extending around said sleeve and end, and a pair of axial pressure exerting threadedly coupled members, surfaces of said elements being close to the outer surface of said ring, said gasket located between another surface of one of said elements and a surface of one of said members, said members maintaining said gasket under said axial pressure and said surfaces of said elements close to the surface of said ring to prevent said enlargement displacement.

7. A combination comprising a pressure-deformable synthetic resinous plastic conduit, a rigid sleeve in one end of said conduit, said sleeve having a circumferential recess, a portion of said end disposed in said recess, said portion having a circumferential recess, a ring in said second mentioned recess. circumferential means extending around said sleeve and end, a first member extending around said sleeve and end and outwardly beyond the outer extremity of said end, a second member extending around said conduit, said means located between said two members, a resilient rubbery gasket extending around said sleeve and end, said means including a rigid element extending around said sleeve and end and being separate from said first member, said gasket located between a surface of said element and a surface of said first member, said members being threadedly coupled together and exerting axial pressure on said gasket and means to maintain said gasket under axial pressure of at least 50 pounds per square inch to store sufficient energy therein that said gasket provides effective sealing and to maintain said means close to said ring thereby to prevent excessive enlargement and displacement of said ring.

References Cited

UNITED STATES PATENTS

| | | | |
|---|---|---|---|
| 546,314 | 9/1895 | Farrey | 285—348 X |
| 2,000,481 | 5/1935 | Harrison | 285—248 |
| 2,120,275 | 6/1938 | Cowles | 285—415 X |
| 2,312,579 | 3/1943 | O'Brien | 285—348 X |
| 2,431,120 | 11/1947 | Howe | 285—348 X |
| 2,546,348 | 3/1951 | Schuman | 285—15 |
| 2,650,840 | 9/1953 | Risley | 285—348 X |
| 2,787,480 | 4/1957 | Staller | 285—238 |
| 3,008,738 | 11/1961 | Longfellow | 285—354 X |
| 3,164,400 | 1/1965 | Weaver | 285—238 X |
| 3,193,310 | 7/1965 | Hildner | 285—248 X |
| 3,244,438 | 4/1966 | Bucheit | 285—55 |

FOREIGN PATENTS

| | | |
|---|---|---|
| 493,163 | 5/1953 | Canada. |
| 1,313,935 | 11/1962 | France. |
| 453,217 | 3/1936 | Great Britain. |
| 740,278 | 11/1955 | Great Britain. |
| 899,541 | 6/1962 | Great Britain. |

CARL W. TOMLIN, *Primary Examiner.*

THOMAS F. CALLAGHAN, *Examiner.*